United States Patent Office 3,131,250
Patented Apr. 28, 1964

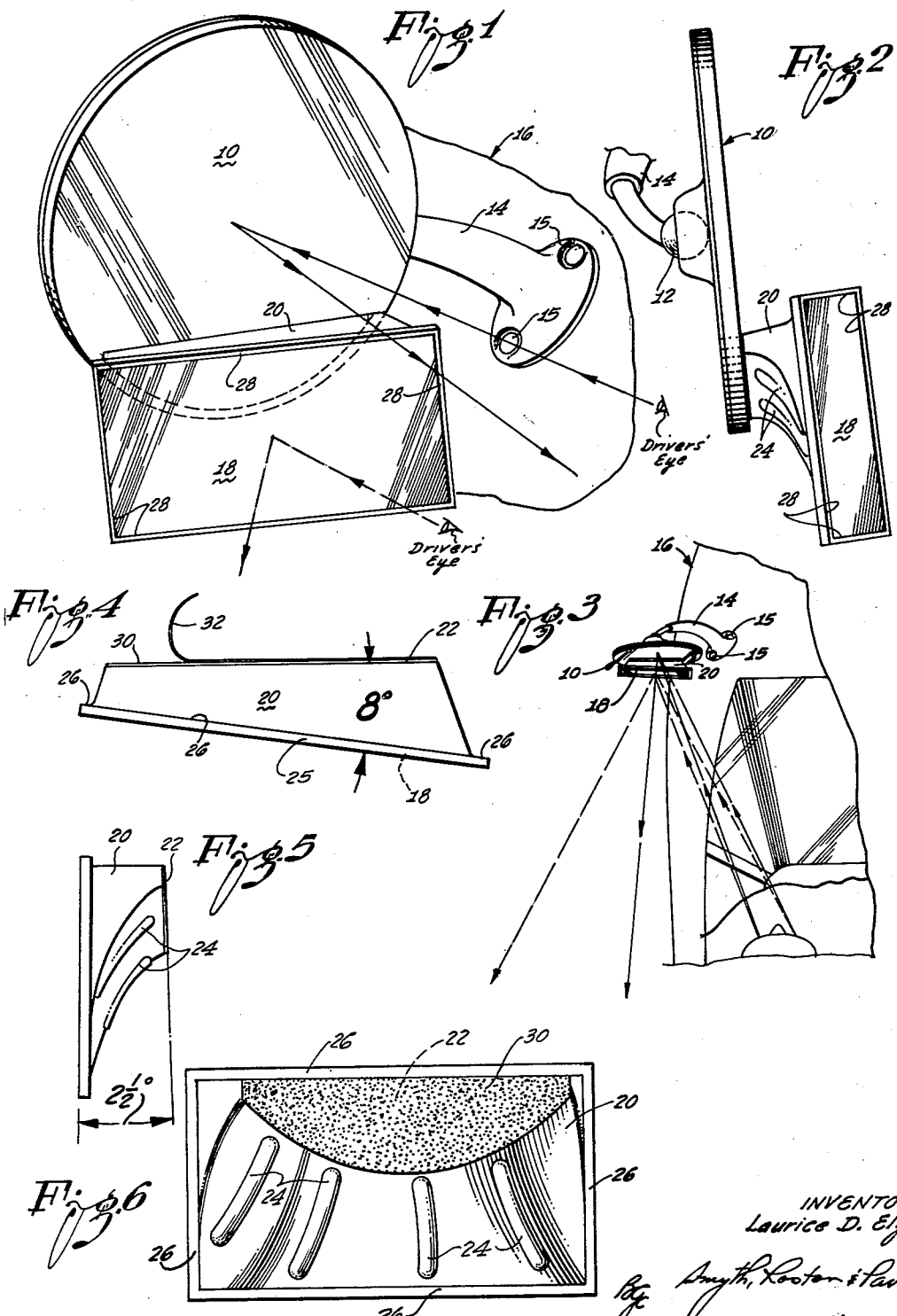

3,131,250
ACCESSORY REAR VIEW MIRROR
Laurice D. Ely, Los Angeles, Calif., assignor to Roelco, Inc., Anaheim, Calif., a corporation of California
Filed Feb. 26, 1962, Ser. No. 175,751
1 Claim. (Cl. 88—87)

This invention is directed to an auxiliary mirror for attachment to a conventional rear view mirror that is usually located on the left front portion of a vehicle, the purpose of the auxiliary mirror being to supplement the field of vision that is afforded by the conventional rear view mirror.

It is well known that the field of view afforded by a conventional rear view mirror on the left side of an automobile is too limited for safety, the mirror having a blind spot which keeps the driver from seeing a car that is relatively close in the next lane to the left of the vehicle. Too often a driver glances at his left rear view mirror and concludes that it is safe to switch to the next lane to the left, only to find that he is crowding against a car that is close up in that lane.

It is possible to eliminate the blind spot and to afford a very wide rearward field of vision by making the conventional rear view mirror of curved configuration as distinguished from a flat or planar configuration. Such a solution to the problem is not acceptable, however, because it not only distorts the image of a rearward car but also reduces the size of the image of the rearward car. The reduction in size of the image of the rearward car reduces the likelihood that the rearward car will be noticed by the driver and, moreover, the reduction in size of the image makes it difficult to judge the actual distance of the rearward car. A rearward car that is dangerously close may appear so far away as to make the hazardous switch-over seem to be safe. It is highly desirable, therefore, that the usual rear view mirror be flat, and that any added auxiliary mirror also be flat so that the driver is given accurate impressions of the distances to rearward cars.

The best location for an auxiliary mirror for this purpose is below but immediately adjacent the conventional or original left rear view mirror and it has been found that the combined vertical dimensions of the two mirrors should be relatively short. For example, if the original rear view mirror is of a diameter on the order of 3¼ or 4 inches, the added auxiliary mirror should not extend more than one inch below the existing mirror. An auxiliary mirror of only one inch vertical dimension, however, would be too small to be useful.

The answer to this dilemma is, in effect, to reduce the vertical dimension of the original mirror to permit the addition of a lower auxiliary mirror of more than one inch in vertical dimension with the combined vertical dimension only one inch greater than the vertical dimension of the original rear view mirror. The problem is to carry out this solution without altering the structure of the original rear view mirror.

The invention teaches that the problem of adding an auxiliary mirror of adequate vertical dimension within the combined vertical limit without altering the construction of the original rear view mirror may be solved by masking the lower margin of the original mirror with the auxiliary mirror and by additionally spacing the auxiliary mirror from the face of the original mirror. Placing the auxiliary mirror somewhat closer to the driver's eyes increases the magnitude of the reflected field of vision relative to the area of the auxiliary mirror so that a two-inch auxiliary mirror at the nearer position provides an adequate field of vision and with the auxiliary mirror masking only a one-inch lower margin of the original rear view mirror, the reduced effective area of the original rear view mirror is adequate.

It has been further found that since the driver looks in a downward direction towards the two mirrors, there is a further advantage in the face of the auxiliary mirror being nearer to the driver than the face of the original rear view mirror, instead of further from the driver than the original rear view mirror. If the auxiliary mirror is located further from the driver than the lower edge of the original rear view mirror, the lower edge of the original mirror cuts off an upper margin of the auxiliary mirror from the driver's view and thus not only reduces the effective vertical dimension of the auxiliary mirror but also results in an unnecessary gap between the two reflected fields of vision. With the lower auxiliary mirror closer to the drive than the original mirror, however, the full area of the auxiliary mirror is effective and there is little if any gap between the two reflected fields of vision.

Since the plane of the auxiliary mirror must be tilted in two respects relative to the existing rear view mirror to reflect a wider rearward angle and also to compensate for the nearer position of the auxiliary mirror, the problem arises of how to mount the auxiliary mirror on the original mirror in a simple, inexpensive but reliable manner without subjecting the original mirror to damaging stresses. This problem is solved by attaching an appropriately tapered mounting body or support body to the back of the auxiliary mirror and by simply adhesively bonding the support body to the lower area of the space of the original rear view mirror. For this purpose the support body has a planar back face to mate with the front face of the original rear view mirror.

A further feature of the invention is the concept of employing a hollow mounting body comprising a formed sheet of a suitable plastic having flanges in engagement with the margins of the auxiliary mirror. Such a mounting body is inexpensive and is not subject to corrosion. With the back face of the mounting body adhesively bonded to the original rear view mirror, the auxiliary mirror is thereby placed at the appropriate degree of inclination relative to the original mirror and adjustment of the original mirror automatically properly positions the auxiliary mirror.

The features and advantages of the invention may be understood from the following detailed description and the accompanying drawing.

In the drawing, which is to be considered as merely illustrative:

FIG. 1 is a perspective view of a conventional rear view mirror on the left side of an automobile with the auxiliary mirror of the present invention mounted thereon;

FIG. 2 is a side elevation of the assembly of two mirrors;

FIG. 3 is a fragmentary plan view on a reduced scale showing the relation of the mirror assembly to the driver;

FIG. 4 is a plan view of the auxiliary mirror and the mounting body that is attached thereto;

FIG. 5 is a side elevation of the auxiliary mirror and the mounting body attached thereto; and FIG. 6 is a rear elevational view of the mounting body.

FIGS. 1, 2 and 3 show a conventional flat circular rear view mirror 10 mounted by a ball joint 12 on a bracket 45 which bracket is mounted by fastening elements 15 on the side of an automobile body 16 in the usual position forward of the driver's seat. FIGS. 1, 2 and 3 also show how the accessory which is the subject of the present invention is mounted on the conventional flat circular rear view mirror 10.

The accessory comprises a flat auxiliary mirror 18 and a mounting body or support body 20 adapted for fixedly mounting the flat auxiliary mirror 18 on the lower marginal portion of the original rear view mirror 10. In this particular embodiment of the invention the auxiliary mirror 18 is of rectangular configuration, the vertical dimension of the mirror being approximately two inches and the width of the mirror being approximately 3½ inches. The mounting body 20 has a planar back face 22 which, as shown in FIGS. 4 and 5 is inclined in two respects relative to the plane of the auxiliary mirror 18. Thus FIG. 4 indicates that the mounting body 20 tapers leftward so that the planes of the auxiliary mirror 18 and the back face 22 converge leftward from the mounting body, and FIG. 5 shows how the mounting body 20 tapers upward to cause the two planes to converge upward from the mounting body. The angle of leftward convergence may be on the order of 8° as indicated in FIG. 4 or may be as low as 4° or as high as 12°. As indicated in FIG. 5 the upward convergence of the planes of the auxiliary mirror 18 and the back face 22 may be on the order of 2½° but this angle may be as low as ½° and as high as 4°. The two angles depend upon the position of the auxiliary mirror relative to the automobile body and relative to the driver's eyes.

The mounting body 20 may be a solid body of any suitable material but a feature of the present embodiment of the invention is that the mounting body is a hollow body formed from a relatively thin sheet of a suitable thermoplastic resin, the tapered portion of the hollow body being reinforced by ribs 24 formed in the plastic sheet material. The mounting body 20 forms a rectangular seat 25 to receive the auxiliary mirror, with the mirror seating against an inner shoulder 26 (FIGS. 4 and 6) that extends around the seat. The plastic sheet that forms the mounting body 20 is further formed with flanges 28 (FIG. 1) that overlie the margin of the face of the auxiliary mirror to hold the auxiliary mirror firmly in the seat 25.

Any suitable means may be provided for fixedly attaching the mounting body 20 to the original rear view mirror 10. A feature of the preferred practice of the invention, however, is the concept of providing the back face 22 of the mounting body with a pressure-sensitive adhesive layer for adhesively bonding the back face to the surface of the rear view mirror 10. In the illustrated embodiment of the invention a sheet 30 covers the back face 22 of the mounting body 20, the sheet being of a well-known type having pressure-sensitive adhesive coatings on both of its surfaces, one of the adhesive coatings bonding the sheet to the back face.

When the accessory is sold to purchasers the outer adhesive coating of the sheet 30 is covered by a suitable protective sheet 32 which may be readily peeled off by the purchaser. FIG. 4 shows the protective sheet 32 partially peeled away from the adhesive sheet 30. With the protective sheet 32 removed it is a simple matter to press the mounting body 20 against the front face of the original rear view mirror 10 to cause the mounting body to be adhesively bonded to the rear view mirror at the relative position shown in FIGS. 1, 2 and 3.

Since the back face 22 of the mounting body 20 is appropriately inclined relative to the plane of the auxiliary mirror 18, the bonding of the back face of the mounting body to the front face of the original rear view mirror 10 automatically positions the auxiliary mirror 18 at the proper inclination relative to the plane of the original rear view mirror. Since the mounting body 20 spaces the auxiliary mirror 18 towards the driver from the original rear view mirror 10, the rear view mirror cannot partially cut off the auxiliary mirror from the driver's face.

My description in specific detail of the selected embodiment of the invention will suggest various changes, substitutions and other departures from my disclosure within the spirit and scope of the appended claim. For example, it is obvious that the invention may be applied to a rear view mirror on the right front side of an automobile, the taper of the mounting body being reversed for this purpose. It is also obvious that the auxiliary mirror may be mounted on the original rear view mirror by means other than adhesive material. Thus the auxiliary mirror may be mounted on the original rear view mirror by a suitable clamp means or by a U-shaped spring metal clip.

I claim:

An accessory for attachment to a conventional planar rear view mirror adjustably mounted on a side of a vehicle to afford the driver a rearward view, said accessory including the combination of:

a wedge-shaped supporting member having a planar front face and a planar rear face inclined thereto, said rear face being larger than the mirror portion on the said conventional rear view mirror to be covered by said front face, said mirror-supporting surface having a predominant direction of extension, there being a first fixed angle of inclination within the range of ½° to 4° measured in a reference plane extending perpendicularly to said predominant direction of extension, there being defined a second fixed angle within the range of 4° to 12° measured in a second reference plane which includes said direction of extension and which is perpendicular to the first reference plane;

a planar mirror fixedly mounted on said rear face;

and adhesive means on the front face of said supporting member for attaching said supporting member to said conventional mirror whereby said supporting member can be moved bodily with said conventional mirror as the latter is moved by the driver to a position to afford the proper rearward view for the driver, the said first and second angles being such as to dispose the auxiliary mirror in a predetermined required position relative to said conventional mirror to afford a rearward view outwardly spaced from the rearward view afforded by said conventional mirror.

References Cited in the file of this patent

UNITED STATES PATENTS

| | | |
|---|---|---|
| 1,114,559 | Weed | Oct. 20, 1914 |
| 1,771,061 | Rice | July 22, 1930 |
| 1,898,791 | Schlumbohm | Feb. 21, 1933 |
| 2,279,751 | Hensley | Apr. 14, 1942 |
| 2,432,928 | Palmquist | Dec. 16, 1947 |
| 2,663,224 | Younglove | Dec. 22, 1953 |
| 2,698,595 | Morgan | Jan. 4, 1955 |
| 2,789,381 | Belgard | Apr. 23, 1957 |
| 3,009,392 | Snell | Nov. 21, 1961 |

FOREIGN PATENTS

| | | |
|---|---|---|
| 736,382 | Great Britain | Sept. 7, 1955 |
| 768,637 | Great Britain | Feb. 20, 1957 |
| 827,336 | Great Britain | Feb. 3, 1960 |